May 16, 1944.  W. H. FREDRICKSON  2,348,800
APPARATUS FOR ICING BAKERY GOODS
Filed April 14, 1941  3 Sheets-Sheet 3
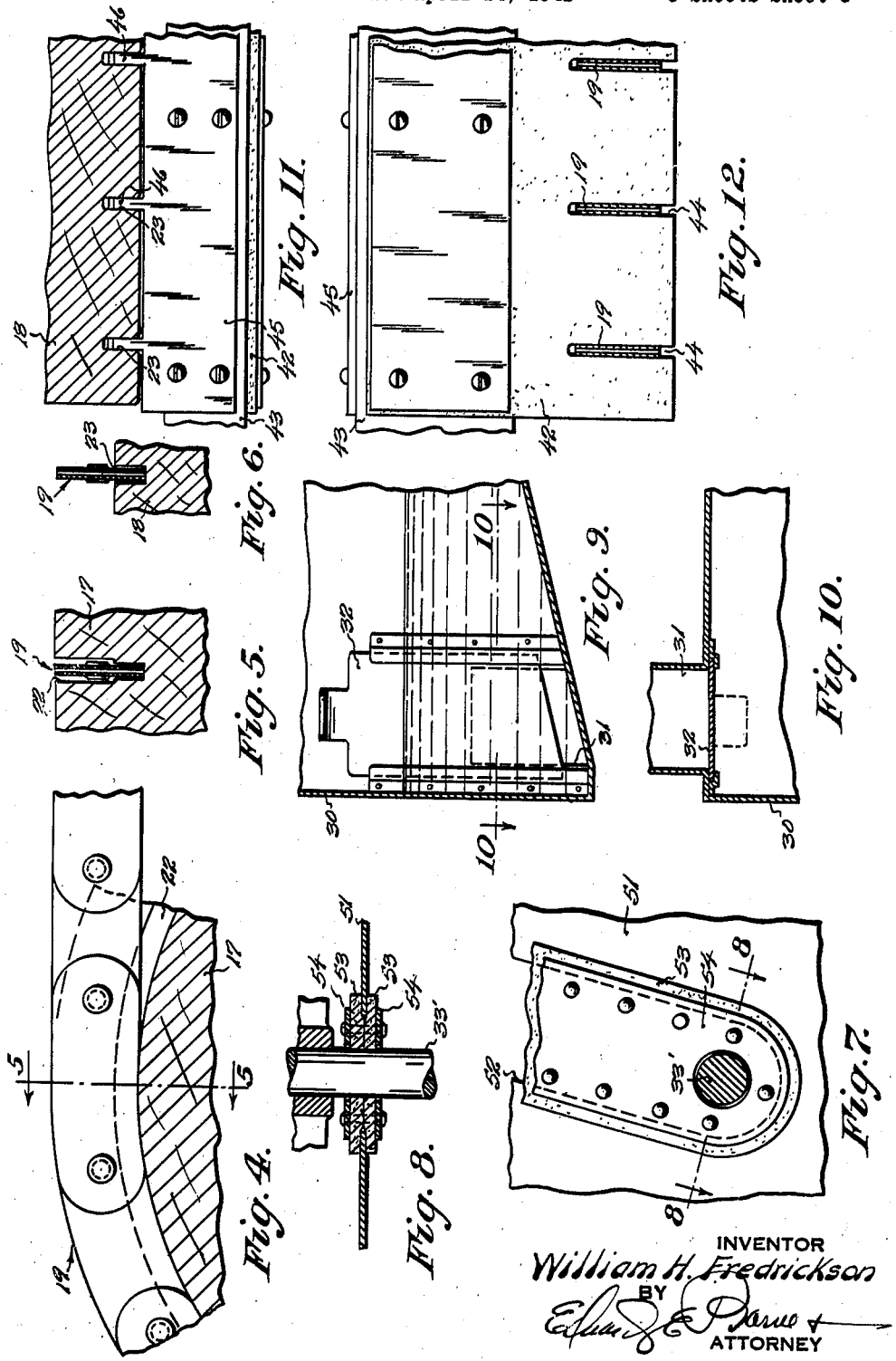
INVENTOR
William H. Fredrickson
BY
ATTORNEY Patented May 16, 1944

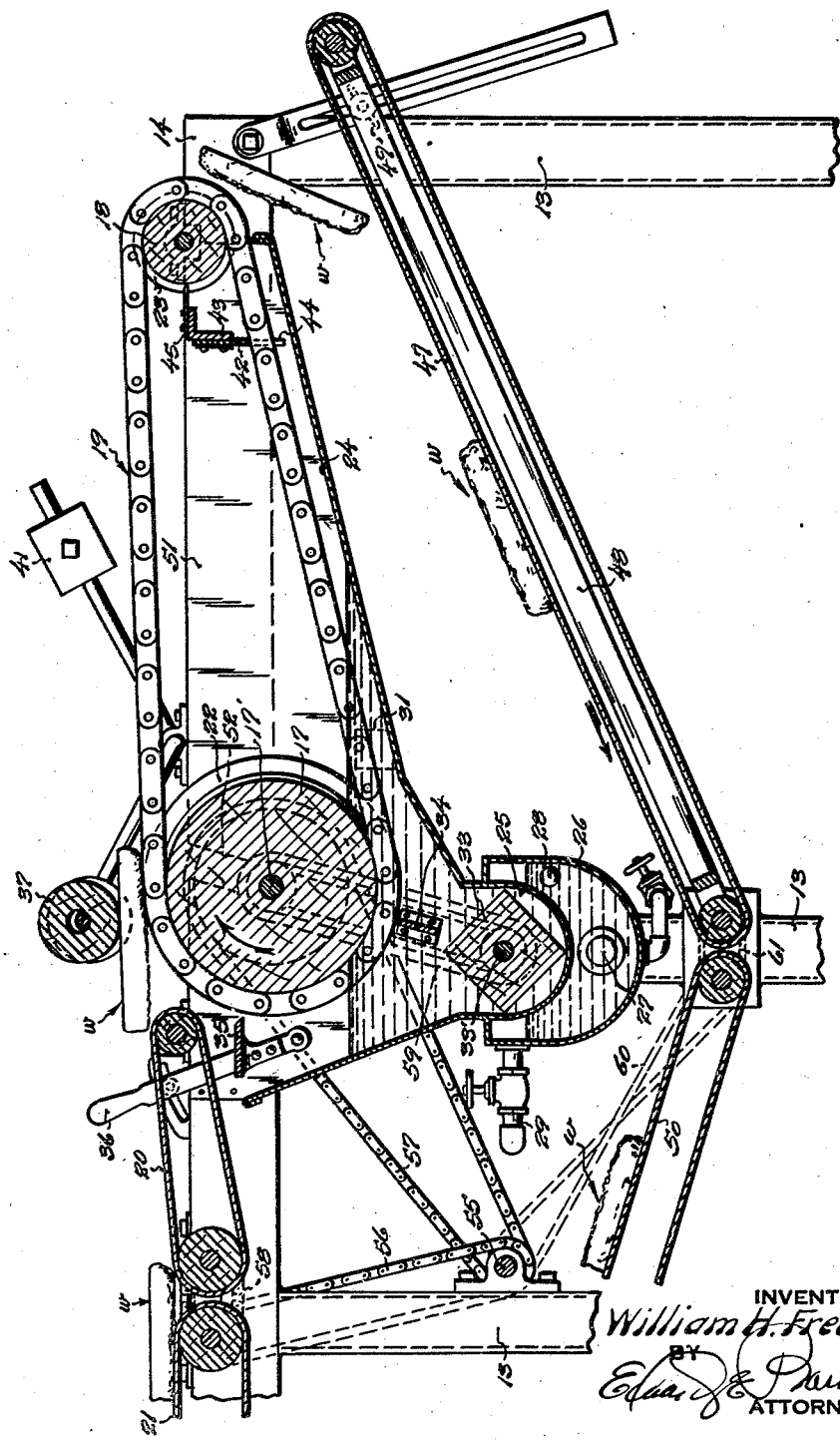

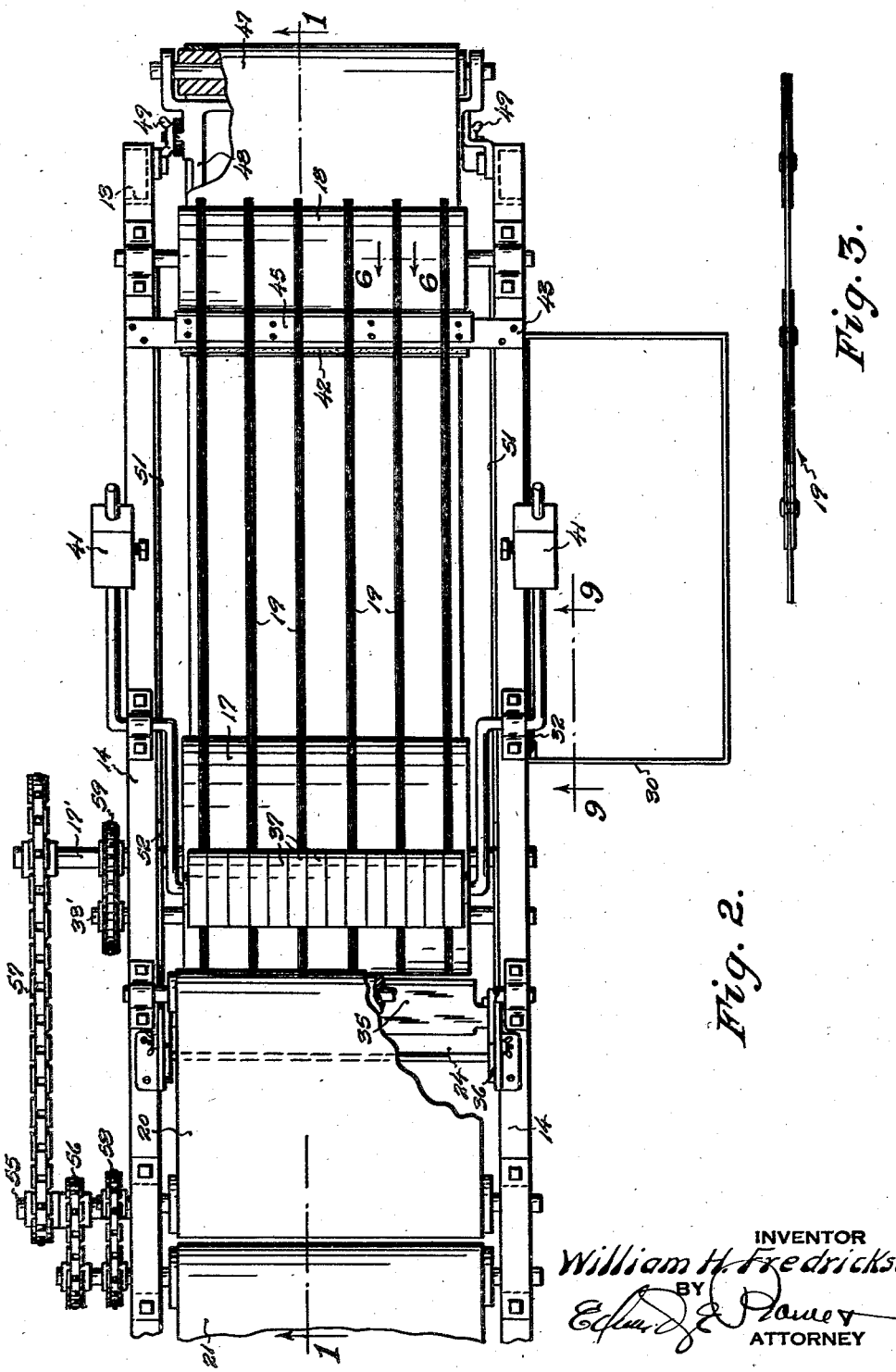

2,348,800

UNITED STATES PATENT OFFICE 2,348,800

APPARATUS FOR ICING BAKERY GOODS

William H. Fredrickson, Seattle, Wash., assignor to Le Conie Stiles, Seattle, Wash.

Application April 14, 1941, Serial No. 388,429

8 Claims. (Cl. 91—2)

This invention relates to icing machines, which is to say machines for applying viscid preparations including sugar or an equivalent sweetening ingredient to the surface of coffee cakes; and for its general object aims to provide a machine for this purpose characterized in that the same permits a predetermination of the quantity of icing applied to the work and by such predetermination assures a uniformity in the bakery goods and a very appreciable saving in the production cost by eliminating the icing waste inherent to all methods of icing heretofore practiced.

More particular objects and advantages will appear in the course of the following description and claims, the invention consisting in the novel construction and in the adaptation and combination of parts hereinafter described and claimed.

In the accompanying drawings, wherein is illustrated a machine constructed in accordance with the present invention:

Figure 1 is a longitudinal vertical section on line 1—1 of Fig. 2.

Fig. 2 is a top plan view of the machine with the feed belt shown fragmentarily, and for simplicity in illustration representing the chain-conveyor, which functions to support the work during a drying interval following application of the icing, somewhat diagrammatically.

Fig. 3 is a fragmentary top plan view to an enlarged scale detailing several links of said conveyor chain.

Fig. 4 is a fragmentary side elevational view of said chain showing the same in its passage about the icing drum, and representing the latter, considered in terms of its own axis, in transverse vertical section.

Fig. 5 is a fragmentary longitudinal vertical section on line 5—5 of Fig. 4.

Fig. 6 is a section similar to Fig. 5 but taken through the complementing forward roller of the machine, indicated by the line 6—6 of Fig. 2.

Fig. 7 is a fragmentary vertical section taken to an enlarged scale longitudinally of the machine and detailing the manner in which the machine chassis is fitted in the icing pan.

Fig. 8 is a horizontal section on line 8—8 of Fig. 7.

Fig. 9 is a fragmentary longitudinal vertical section on line 9—9 of Fig. 2 to detail the sliding gate which serves the office of a regulating valve to replenish the icing in the pan from a reservoir mounted at one side of the latter.

Fig. 10 is a horizontal section on line 10—10 of Fig. 9.

Fig. 11 is a fragmentary horizontal section to an enlarged scale detailing the comb device which lies at the discharge end of the machine and functions to clear icing from the grooves provided in the forward roller of the conveyor-chain assembly; and Fig. 12 is a fragmentary transverse vertical section, using a scale corresponding to that of Fig. 11, detailing the wiping apron which functions to remove adherent icing from the conveyor chain.

Having reference to said drawings, the numeral 13 indicates the upright standards and 14 the side rails of a suitable framework, and extending transversely thereof at spaced intervals of the length are a pair of shafts on which are mounted a drum 17 and a roller 18 acting in conjunction to carry an endless conveyor comprised of a plurality of transversely spaced apart link chains 19. The said drum lies at the admission end of what may be considered the icing machine proper, acts as the icing element, and receives the work $w$ over the upper level thereof from a secondary feed belt 20 which is in turn fed from a primary feed belt 21, the work having been placed upon the latter in an inverted or upside-down condition. Said secondary belt is of import to the machine in that a gap is defined between its admission end and the discharge end of the primary feed belt, loose crumbs being passed therethrough to a disposal chute (not shown).

Describing the chains 19 in more particularity, the same are or may be of conventional form excepting that the links therefor are stamped from spring steel of such narrow gauge as to produce a relative knife edge, and these thin chains work in grooves, as 22 and 23, cut in the surfaces of the drum and roller, the grooves 22 being of a depth corresponding to the depth of the chains and the latter in consequence being flush with the drum in their travel about the same, whereas the grooves 23 are by comparison relatively shallow and provide an appreciable projection of the links beyond the perimeter of the roller.

In supplying the icing, in the nature of a dip-coating, to the surface of the drum I suspend from the side rails of the framework an open-top pan of which the floor 24 leads longitudinally from a point immediately below the roller 18 to a jacketed sump 25 occupying a position below the drum, the jacket 26 of the sump functioning as a radiator which is heated through the agency of an electric element 27 automatically controlled by a thermostat 28 and receiving its water from a valved supply pipe 29. In the bottom of the radiator is a suitable drain. To maintain the icing within the pan at a relatively constant level somewhat above the lower limits of the drum but below the axis thereof I provide at one side of the pan a reservoir 30 from which icing is fed into the pan through an opening 31 closed by a sliding gate 32.

Reverting to the sump, formed desirably to a semi-cylindrical cross sectional configuration, it will be seen that a shaft 33' lies centrally thereof and supports a rotor 33, the rotor functioning in the manner of a pump in that pockets are defined about the same to carry successive charges of icing from what may be considered as the "drippings" end of the pan about the underside of the block wherefrom, heated by the radiator, the icing is discharged in a melted condition to be picked up by the drum and applied thereby to the underside of the work, said melted icing being isolated from the drippings by a partitioning plate 34 interposed between the drum and the pumping rotor 33. Designated by 35 is a wiping blade carried for adjustment by lever arms 36 for governing the effective thickness of the dip-coating on the drum, and denoted by 37 are presser devices for holding the conveyed work down upon the drum, these presser devices comprising rings arranged for independent vertical deflection through the instrumentality of mounting a severalty of the same in side-by-side relation upon a transverse bar of less diameter than the openings within the rings, the effective pressure of said devices being governed by counter-weights 41.

Each of the conveyor chains, as well as the grooves 23, are desirably cleaned in the operation of the machine to prevent a "building up" of the icing thereon, and employed to accomplish the former of these ends is an apron 42 of leather which is supported from one leg of an angle-iron bracket 43 to lie in the path of the return travel of the conveyor, the leather being slit vertically at intervals of its length to form wiping-ways 44 through which the chains are drawn. For clearing the grooves and additionally removing icing from the periphery of the roller a comb 45 is supported by the other leg of the bracket, the teeth 46 thereof entering the grooves.

Located beneath the pan to receive the work discharged from the conveyor chains 19 is a conveyor belt 47 leading to a return belt 50 which carries the work to a suitable table (not shown) whereat the iced cakes are wrapped. It is the office of this belt 47 to act in complement with the gravity drop of the discharged work to effect a half-flip of the latter and thereby turn the work right side up, the belt to this end being given a directional travel converse to that of the conveyor chains. It will of course be apparent that the time interval necessary to turn a cake of relatively short length is less than that necessary to turn a cake of extended length, and in consequence I mount the belt such that the receiving end is vertically adjustable about the opposite or delivery end as a pivot, a frame for such mounting including a stringpieces 48 which are fixed in adjusted positions by means of wing-nuts 49.

An important feature of my machine which, however, is of no moment to the icing office is a provision for a ready dismantling of the conveyor-chain assembly, including the subjacent block 33, from the pan proper to permit the latter to be cleaned. To this end the side walls 51 of the pan (Figs 7 and 8) are vertically slotted as at 52, these slots allowing the drum and block shafts 17' and 33', respectively, to be lowered as a connected unit into the pan with the margins of the slots fitting between gaskets 53 of leather or an equivalent sealing material caught between metal straps 54, the gaskets and the straps being pierced for the passage therethrough of the shafts.

Power to the several motive parts of the machine is derived from an electric motor (not shown) to drive a transverse shaft 55 from which chains 56—57 lead, respectively, to the belt 21 and the drum 17, and therefrom through chains 58—59 to the belt 20 and the rotor block 33. Also driven from said power shaft 55 and indicated by dotted lines is a drive belt 60 to the conveyor belt 50, and driving the conveyor belt 47 is a drive belt 61 having a power take-off from the belt 50.

The illustrated and described embodiment obviously partakes of numerous modifications without departing from the spirit of the invention as defined in the hereto annexed claims.

What I claim, is:

1. A machine for icing bakery goods comprising, in combination: a pan for the icing; a rotary drum working above the pan and by rotation dipping into the icing to obtain a surface coating of the icing thereon; devices for delivering the bakery goods in an inverted condition onto the upper surface of the drum to have the coating adhere to the underside of the goods; and mechanism functioning by rotation of the drum to remove the iced goods therefrom, said mechanism comprising a severalty of endless conveyor chains carried in side by side relation and at one end of their travel passing about the drum, said chains being characterized in that the links thereof are given substantial depth and are formed from spring steel of such narrow gauge as to produce an approximate knife-edge thickness.

2. A machine for icing bakery goods comprising, in combination: a rotary drum; a work-feed for delivering the bakery goods in an inverted condition onto the upper surface of the drum; means for applying a surface coating of icing to the under-surface of the drum whereby the rotary travel of the drum transfers the icing to the underside of the goods delivered onto the upper surface of the drum; and presser devices acting to hold the delivered goods down upon the drum during the icing function of the latter, said presser devices comprising a severalty of weighted rollers mounted in side by side relation and arranged for independent vertical deflection to accommodate variations in the surface contour of the goods being iced, and a counter-weight acting in complement with said weighted rollers for modifying the effective pressure exerted upon the goods.

3. A machine for icing bakery goods comprising, in combination: a pan for the icing formed at one end with a water-jacketed sump and having a sloping floor leading from the opposite end thereto; means for applying heat to the jacketing water of the sump for melting the icing; an idler roller mounted above the high end of the pan and provided in its periphery with circumferentially extending grooves disposed in laterally spaced relation; a live drum working above the sump and in its rotary travel dipping into the melted icing to carry a coating of the latter from the under surface to the upper surface of the drum, said drum being provided in its periphery with circumferentially extending grooves of a depth greater than the grooves of the roller and spaced to correspond with the latter; endless chains working in the spaced grooves of said drum and roller and produced such that the same lie flush with the periphery of the drum and in consequence project outwardly beyond the periphery of the roller, the directional travel of said drum causing the upper run of the respective chains to work from the drum toward the roller; work-feeding conveyor devices corresponding in directional travel to the travel of the chains operating to deliver the bakery goods in an inverted condition onto the upper surface of the drum wherefrom, following a transfer of icing from the drum to the underside thereof, the goods are conveyed on the upper run of the chains and discharged from the roller ends thereof; and conveyor devices lying below the discharge end of the chain-conveyor for receiving the work discharged from the latter.

4. An icing machine according to claim 3 having a wiping apron acting on the return run of the chains to clean the icing therefrom.

5. A machine for icing bakery goods comprising the combination of a pan for the icing; means for applying heat to the bottom wall of the pan for melting the icing; a rotary drum working above the pan and in its rotary travel dipping into the melted icing; a rotor element submerged in the icing in intervening relation between the drum and said heated bottom wall of the pan and by rotation acting to draw congealed matter within the icing into proximity of said heated wall for melting the congealed matter; an icing reservoir for replenishing the icing within the pan having a valved feed discharging into the pan at the side of the rotor at which the drum enters the icing, thereby causing additional icing introduced from the reservoir to be brought by the directive influence of the rotor under the melting influence of the heated bottom wall before being picked up by the clearing surface of the drum and carried to the upper surface of the latter; and work-feeding devices operating to deliver the goods in an inverted condition onto said upper surface of the drum to obtain a transfer to the underside of said goods of the coating of icing carried by rotation of the drum from the under to the upper surface of the latter.

6. In an icing machine, in combination: a rotary drum circumferentially grooved at spaced intervals of its length and arranged to dip into a supply of icing material for obtaining a surface coating of the latter upon the drum; a roller longitudinally spaced from said drum; and a severalty of endless conveyor chains passing in side by side relation about said roller and the drum, said chains being received in the grooves of the drum and being characterized in that the links thereof are of knife-edge thickness and substantial depth to permit the same to cut into icing material congealed within the grooves of the drum.

7. The icing machine of claim 6 having a wiping apron for clearing the sides of the chain links of adherent icing and comprised of a flexible member extending transversely of the chains in the path of travel of the latter and slit at intervals corresponding to the spacing between the chains to describe wiping-ways through which the chains are drawn.

8. A machine for icing bakery goods comprising, in combination: a pan for the icing; a rotary drum working above the pan and in its rotary travel dipping into the icing to carry a coating of the latter from the under surface to the upper surface of the drum, said drum being provided in its periphery with circumferentially extending grooves disposed in laterally spaced relation; a rotary drive for the drum; a roller complementary to the drum and revolubly mounted for movement about an axis paralleling the drum axis and provided in its periphery with circumferentially extending grooves related to the grooves of the drum but of shallower depth; and endless chains working in the related grooves of said drum and roller and produced such that the same lie relatively flush with the periphery of the drum and in consequence project outwardly beyond the periphery of the roller, the machine being adapted to have the bakery goods delivered in an inverted condition onto the upper surface of the drum wherefrom, following a transfer of icing from the drum to the underside of the goods, the latter are conveyed on the upper run of the chains and discharged from the roller ends thereof.

WILLIAM H. FREDRICKSON.